Nov. 11, 1969 F. A. OTTER, JR., ET AL 3,478,230

THERMOMAGNETIC GENERATION OF POWER IN A SUPERCONDUCTOR

Filed April 17, 1967 2 Sheets-Sheet 1

INVENTORS
FRED A. OTTER JR.
PETER R. SOLOMON
GEORGE B. YNTEMA

BY Donald F. Bradley
ATTORNEY 3,478,230

THERMOMAGNETIC GENERATION OF POWER IN A SUPERCONDUCTOR

Fred A. Otter, Jr., Manchester, Peter R. Solomon, Bloomfield, and George B. Yntema, Bolton, Conn., assignors to United Aircraft Corporation, East Hartford, Conn., a corporation of Delaware Filed Apr. 17, 1967, Ser. No. 631,399
Int. Cl. H02n 7/00
U.S. Cl. 310—4 10 Claims

ABSTRACT OF THE DISCLOSURE

A voltage is generated across a superconductor by means of moving vortices formed therein when the superconductor is placed in a magnetic field and a thermal gradient is established along the superconductor in a direction perpendicular to the magnetic field thereby exerting a force on the vortices in the same direction as the thermal gradient.

CROSS-REFERENCE TO RELATED APPLICATION

A thermomagnetic apparatus embodying principles of this invention is disclosed and claimed in copending application entitled "Thermomagnetic Transfer of Heat Through a Superconductor" Ser. No. 631,480 filed on even date herewith.

BACKGROUND OF THE INVENTION

Field of invention

This invention relates to the generation of power in superconductors that are in the mixed and intermediate state and more particularly to methods and apparatus for generating a voltage across a superconductor by means of a thermal gradient.

Description of the prior art

In the superconductor art, it is commonly known that when a magnetic field above a critical value is applied to a superconductor (a material that has no resistance when its temperature is reduced to a point near absolute zero) a pattern of cylindrical cores of normally conducting material (vortices) are produced in the superconductor. Above the critical value of magnetic field the flux lines, heretofore expelled from the superconductor material, are able to penetrate and pass through the superconductor at the centers of the vortices. Cylindrical cores of normally conducting material are produced at the center of the vortices and alternate with superconducting material to form what in cross section is a polka dot pattern. See, for example, P. G. DeGennes, Superconductivity of Metals and Alloys (W. A. Benjamin, Inc., New York, 1966).

It is well known in the art that when a current is passed through a superconductor, perpendicular to a magnetic field, a force is exerted on the vortices formed therein, causing them to move perpendicular to the magnetic field and to the current flow. The tendency is for the vortices to form at one edge of the superconductor and travel through the superconductor to the other edge where they disappear. A potential drop is produced perpendicular to the motion of vortices.

In any cold temperature environment (temperatures below 20° K.) the operation and predictability of electrical power-generating equipment is uncertain and quite often even impossible, due to the breakdown and erratic behavior of components.

The exploration and conquest of space requires space vehicles that are capable of operating for prolonged periods of time in cold temperature environments (approximating superconductor temperatures, i.e., below 18° K.). At these excessively low temperatures, the proper design of batteries and associated electronic equipment utilized to provide power for a space vehicles control equipment is extremely difficult.

Superconducting magnets and solenoids typically use large electrical currents. To supply these currents from sources at higher temperatures involves thick electrical leads through which heat flows in substantial amounts. This creates a serious load condition on the refrigeration system. The problem of heat leak is avoided by using a current source at approximately the temperature of the magnet.

SUMMARY OF INVENTION

An object of the invention is to provide an improved method and apparatus for generating electrical power in a cold-temperature environment using readily available heat energy.

In accordance with the present invention, vortices in a superconductor, set in motion by the combined effect of a magnetic field and thermal gradient, generate electrical power.

The foregoing and other objects, features and advantages of the present invention will become more apparent in the light of the following detailed description of a preferred embodiment thereof, as illustrated in the accompanying drawings.

DESCRIPTION OF THE PREFERRED EMBODIMENT

Figure 1:
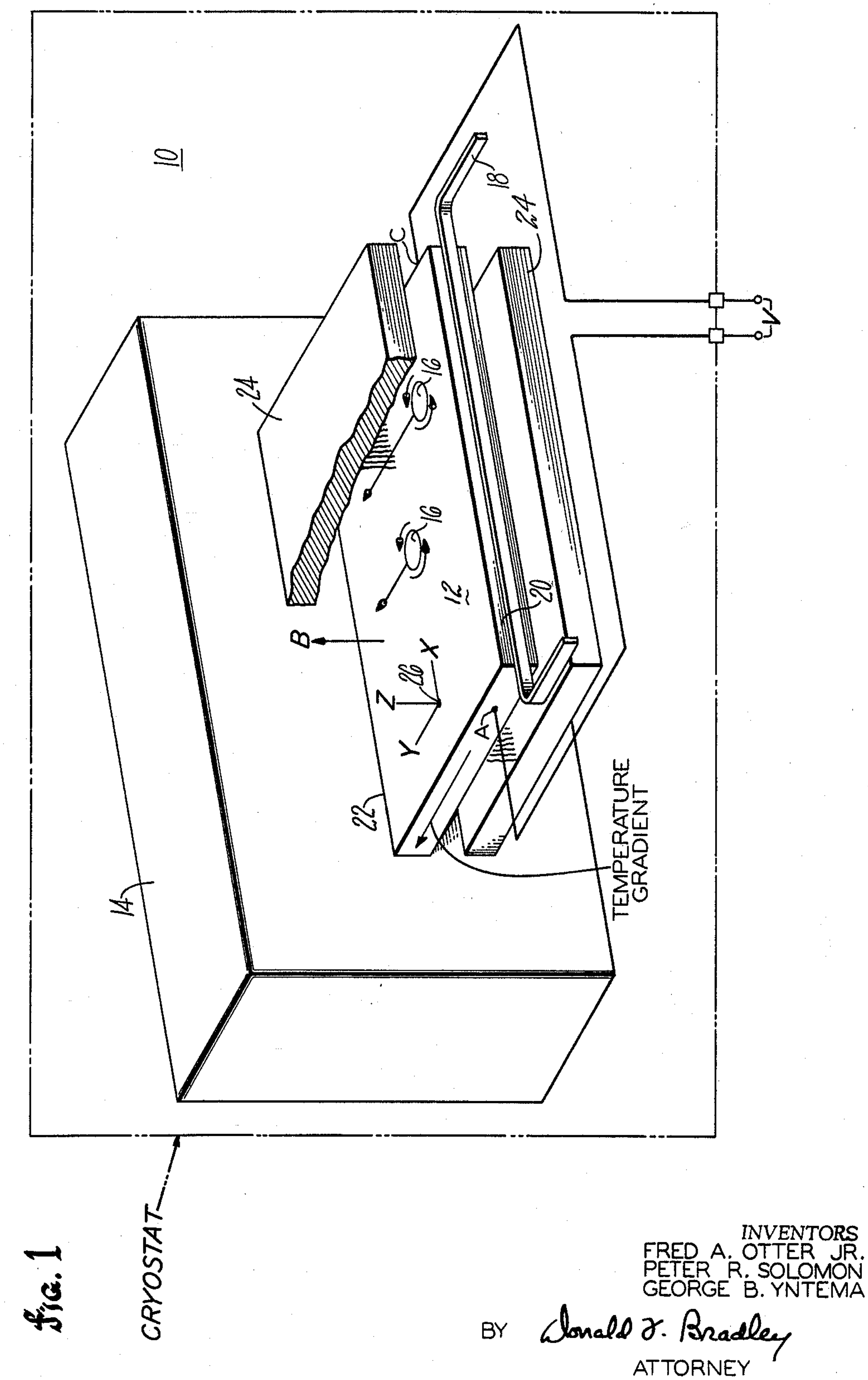
FIGURE 1 is a perspective view of a preferred embodiment of the invention employed to generate power.

Referring generally to the embodiment illustrated in FIGURE 1, a Cryostat 10 is utilized to provide the necessary superconducting temperatures. In a cold temperature environment such as outer space, a Cryostat or similar device may not be necessary. A superconductor 12 disposed in Cryostat 10 is placed in thermal contact with a heat sink 14. Preferably, the superconductor 12 is a Type II superconductor in the mixed state, however, a Type I superconductor in the intermediate state will also form a plurality of vortices 16, as described hereinbefore, and superconducting material. A magnetic field B, provided by a magnetic field source 24, is directed perpendicular to superconductor 12 in the Z direction (see coordinates 26). A conventional heating element such as an electrical resistance heater 18 provides a source of heat to warm edge 20 of superconductor 12. Any convenient source of heat can be used and, of course, under the condition dictated by a space environment heat source 18 could comprise the sun's rays or heat from a reactor or an engine. The application of this heat to edge 20, in conjunction with the cooling effect of heat sink 14 at edge 22, creates a thermal gradient through the superconductor. The heat flows from the heat source 18, through the superconductor 12 along the Y axis and into heat sink 14. The effect of this thermal gradient along the Y axis is to apply a force on the vortices 16, causing them to move across the superconductor in the Y direction from edge 20 to edge 22; the direction of vortex motion being dependent upon the direction of the thermal gradient from hot to cold. In FIGURE 1, the vortices 16 are created on edge 20 of the superconductor 12 making contact with heat source 18, and travel through the superconductor 12 to disappear at the opposite edge 22 in contact with heat sink 14.

Associated with this magnetic field, thermal gradient and motion of vortices is a difference of potential developed along the X axes, i.e., between points A and C.

This potential difference is believed to be induced by the continuous motion of vortices, i.e, the voltage appearing between points A and C along the X axis does not appear to be the usual ohmic voltage. See: G. B. Yntema, American Physical Society Bulletin, 10, 580, June, 1965 and Errata, American Physical Society Bulletin, 11, 663, 1966.

The observed effect is several thousand times larger than the Nernst effect seen in a normal metal, i.e., in the presence of a magnetic field in the Z direction, a thermal gradient in the X direction produces a perceptible small voltage in the Y direction.

In theory, the thermal gradient through the superconductor exerts a force F on the vortices, which is equal in magnitude to the transport entropy S per unit length of a vortex, times the temperature gradient $\Delta T$ between edges 20 and 22 of the superconductor and directed toward the colder region, i.e., F equals $-S\Delta T$. The transport entropy S of a vortex times the temperature is the quantity of heat transported by a vortex from one side of the superconductor to the other. This heat transporting ability of a vortex is largely associated with the fact that the core of a vortex comprises a normal nonsuperconducting material, yielding a local entropy density which is much higher than the entropy density in the surrounding superconducting regions. The ability of these vortices to hold and transport heat is far greater than any heat transporting capability of random motion molecules in nonvortex metals.

To obtain maximum power from a generator of this kind, the material used for the superconductor should have a large transport entropy S and low value of pinning effect of traps in which the vortices become stuck. For high efficiency a material having a low thermal conductivity should be used.

Superconductors suitable for use according to the present invention include niobium+10–50% tantalum, niobium+10–50% titanium, niobium+10–50% molybdenum and niobium+10% zirconium.

In early experiments (done on a Type II alloy: 60% indium, 40% lead—see Physical Review Letters, 16, 681, 1966) which established the existence of the effect described hereinbefore, a transport current was necessary to assist the thermal force to overcome pinning. This transport current also produced the temperature gradients. In properly prepared materials with a large enough temperature gradient, such an externally supplied transport current is unnecessary and undesirable. Obviously, there are any number of ways to supply heat to produce the thermal gradient and the invention herein does not relate to a particular means for heating the superconductor.

Figure 2:
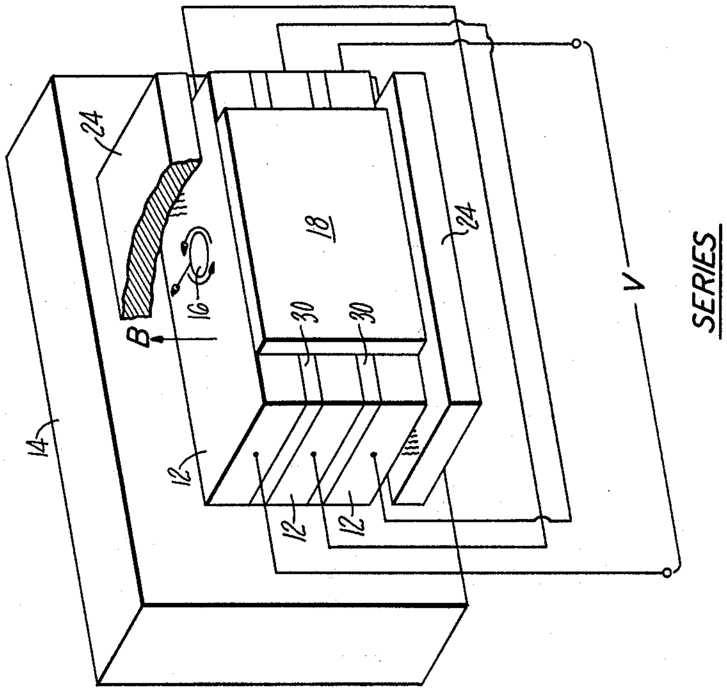
FIGURE 2 is a perspective view of an alternate embodiment of the invention having a plurality of superconductor layers connected in parallel.
Figure 3:
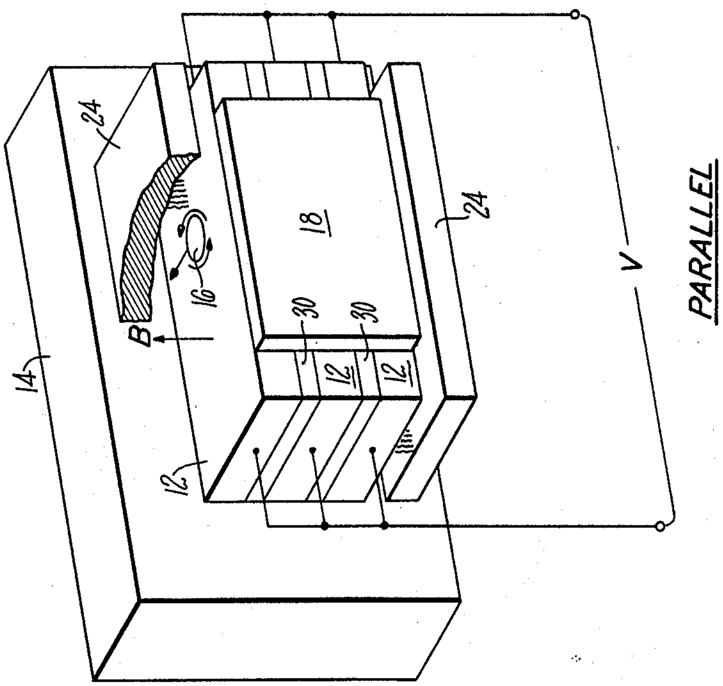
FIGURE 3 is a perspective view of an alternate embodiment of the invention having a plurality of superconductor layers connected in series.

A further embodiment of the present invention is illustrated in FIGURES 2 and 3. In these embodiments, a sandwich is prepared comprising a plurality of layers of superconductor 12, the individual layers 12 separated from each other by insulating layers 30 comprising any suitable insulator such as SiO. Two possible methods of interconnecting the superconductor layers are shown, the series connection of FIGURE 2 and the parallel connection of FIGURE 3. Therefore, emphasis may be placed on voltage or current depending upon whether a series or a parallel connection of superconductor layers is utilized. Operation of the device is the same as described hereinfore in connection with FIGURE 1. That is, heat source 18 heats the superconductor layers and heat sink 14 provides the thermal gradient through the superconductor.

Although the invention has been shown and described with respect to a preferred embodiment thereof, it should be understood by those skilled in the art that various changes and omissions in the form and detail thereof may be made therein without departing from the spirit and scope of the invention which is to be limited and defined only as set forth in the following claims.

Having thus described a preferred embodiment of the invention, what we claim as new and desire to secure by Letters Patent of the United States is:

1. A method of generating thermoelectrical power in a superconductor which comprises:
directing a magnetic field through the superconductor; and heating the superconductor to establish a thermal gradient at substantially right angles to said magnetic field so that a voltage is generated in the superconductor along an axis substantially perpendicular to said thermal gradient.

2. A method of generating electrical power in a superconductor which comprises:
directing a magnetic field through the superconductor to create vortices comprising cores of nonsuperconducting metal therein; and
heating the superconductor to establish a thermal gradient in a direction substantially perpendicular to said magnetic field for exerting a force on said vortices causing said vortices to move through the superconductor in substantially the same direction as said thermal gradient, from hot to cold, whereby said vortices generate a voltage in the superconductor along an axis substantially perpendicular to said thermal gradient.

3. A method of generating electrical power in a superconductor disposed in thermal conducting relationship between a heat source and a heat sink comprising the steps of:
directing a magnetic field through the superconductor; and
heating the superconductor by means of the heat source so that a thermal gradient is established in a direction substantially perpendicular to said magnetic field, whereby a voltage is generated in the superconductor along an axis substantially perpendicular to said thermal gradient.

4. A method of generating electrical power in a superconductor disposed in thermal conducting relationship between a heat sink and a heat source in a vacuum environment comprising the steps of:
directing a magnetic field through the superconductor to create vortices comprising cores of nonsuperconducting metal therein; and
heating the superconductor by means of the heat source to establish a thermal gradient in a direction substantially perpendicular to said magnetic field for exerting a force on said vortices causing said vortices to move through the superconductor in substantially the same direction as said thermal gradient, from hot to cold, whereby said vortices generate a voltage in the superconductor along an axis substantially perpendicular to said thermal gradient as they move through the superconductor from the heat source to the heat sink.

5. An apparatus disposed in an evacuated container for generating electrical power which comprises:
a superconductor disposed in the container;
a heat sink disposed in thermal conducting relationship to said superconductor;
means for directing a magnetic field through said superconductor; and
heat generating means disposed in thermal conducting relationship to said superconductor for establishing thermal gradient in a direction substantially perpendicular to said magnetic field, whereby a voltage is generated in said superconductor along an axis substantially perpendicular to said thermal gradient.

6. The apparatus of claim 5 wherein:

said superconductor comprises an alloy of niobium+ 10–50% tantalum.

7. The apparatus of claim 5 wherein:

said superconductor comprises an alloy of niobium+ 10–50% titanium.

8. The apparatus of claim 5 wherein:

said superconductor comprises an alloy of niobium+ 10–50% molybdenum.

9. The apparatus of claim 5 wherein:

said superconductor comprises an alloy of niobium+ 10% zirconium.

10. An apparatus disposed in an evacuated container for generating electrical power which comprises:

a superconductor disposed in the container;

a heat sink disposed in thermal conducting relationship to said superconductor;

means for directing a magnetic field through said superconductor to create vortices comprising cores of nonsuperconducting metal therein; and heat generating means disposed in thermal conducting relationship to said superconductor to establish a thermal gradient in a direction substantially perpendicular to said magnetic field for exerting a force on said vortices causing said vortices to move through said superconductor in substantially the same direction as said thermal gradient, from hot to cold, whereby said vortices generate a voltage in the superconductor along an axis substantially perpendicular to said thermal gradient as they move through the superconductor from the heat source to the heat sink.

References Cited

UNITED STATES PATENTS

| | | | |
|---|---|---|---|
| 3,054,978 | 9/1962 | Schmidlin et al. | 307—245 X |
| 3,056,889 | 10/1962 | Nyberg | 307—88.5 |
| 3,084,267 | 4/1963 | Newell | 310—4 |
| 3,154,927 | 11/1964 | Simon | 310—4 X |
| 3,201,765 | 8/1965 | Pearl | 340—173.1 |
| 3,305,819 | 2/1967 | Brice et al. | 338—32 |
| 3,343,009 | 9/1967 | Wagini et al. | 310—4 |
| 3,365,652 | 1/1968 | Schwebel | 322—2 |

MILTON O. HIRSHFIELD, Primary Examiner

D. F. DUGGAN, Assistant Examiner

U.S. Cl. X.R.

62—3; 307—306; 322—2